US 12,411,855 B2

(12) United States Patent
Edara et al.

(10) Patent No.: US 12,411,855 B2
(45) Date of Patent: Sep. 9, 2025

(54) MANAGING REAL TIME DATA STREAM PROCESSING

(71) Applicant: Google LLC, Mountain View, CA (US)

(72) Inventors: Pavan Edara, Mountain View, CA (US); Jonathan Forbes, Bellevue, WA (US); Yang Yi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 126 days.

(21) Appl. No.: 18/054,632

(22) Filed: Nov. 11, 2022

(65) Prior Publication Data

US 2023/0070710 A1 Mar. 9, 2023

Related U.S. Application Data

(62) Division of application No. 16/848,833, filed on Apr. 14, 2020, now Pat. No. 11,520,796.

(51) Int. Cl.
*G06F 16/2457* (2019.01)
*G06F 16/22* (2019.01)
(Continued)

(52) U.S. Cl.
CPC ...... *G06F 16/24573* (2019.01); *G06F 16/221* (2019.01); *G06F 16/23* (2019.01); *G06F 16/2458* (2019.01); *G06F 16/248* (2019.01)

(58) Field of Classification Search
CPC ............ G06F 16/24573; G06F 16/221; G06F 16/2458; G06F 16/23; G06F 16/248
(Continued)

(56) References Cited

U.S. PATENT DOCUMENTS 6,151,567 A * 11/2000 Ames ............... H04L 41/0846
709/230
6,889,234 B1 * 5/2005 Li ..................... G06F 16/252
707/999.203
(Continued)

FOREIGN PATENT DOCUMENTS

| CN | 105283872 A | 1/2016 |
|---|---|---|
| CN | 105389352 A | 3/2016 |
| CN | 108875077 A | 11/2018 |

OTHER PUBLICATIONS

International Search Report and Written Opinion of International Application No. PCT/US2021/026929 dated Aug. 6, 2021, 11 pp.
(Continued)

*Primary Examiner* — Hanh B Thai
(74) *Attorney, Agent, or Firm* — Shumaker & Sieffert, P.A.

(57) ABSTRACT

A method for managing data processing includes receiving, from a user of a data query system, a data query for data stored in a data store in communication with the data query system. The method also includes receiving a staleness parameter indicating an upper time boundary for the data query. The upper time boundary limits a query response to data within the data store that is older than the upper time boundary. The method further includes determining whether the data stored within the data store satisfies the staleness parameter. When a portion of the data within the data store fails to satisfy the staleness parameter, the method includes generating the query response that excludes the portion of the data that fails to satisfy the staleness parameter.

14 Claims, 10 Drawing Sheets

(51) Int. Cl.
*G06F 16/23* (2019.01)
*G06F 16/2458* (2019.01)
*G06F 16/248* (2019.01)

(58) Field of Classification Search
USPC .......................................................... 707/722
See application file for complete search history.

(56) References Cited

U.S. PATENT DOCUMENTS

| | | | |
|---|---|---|---|
| 7,228,318 B2* | 6/2007 | Li | G06F 16/252 |
| | | | 707/999.203 |
| 8,645,958 B2* | 2/2014 | Huetter | G06F 9/5066 |
| | | | 718/101 |
| 9,251,053 B2* | 2/2016 | Hyun | G06F 12/0238 |
| 9,323,465 B2* | 4/2016 | Flynn | G11C 16/06 |
| 9,659,039 B2 | 5/2017 | Ziauddin et al. | |
| 9,860,317 B1* | 1/2018 | Gupta | H04L 67/1097 |
| 9,916,352 B2 | 3/2018 | Chaudhry et al. | |
| 10,095,738 B1* | 10/2018 | Caldwell | G06F 16/9535 |
| 10,216,631 B1* | 2/2019 | McConnell | G06F 12/0808 |
| 10,353,927 B2* | 7/2019 | Tadeski | G06F 16/2365 |
| 10,503,792 B1* | 12/2019 | Frieder | G06F 12/0871 |
| 10,599,625 B2* | 3/2020 | Tran | G06F 16/2393 |
| 10,671,641 B1* | 6/2020 | Holenstein | G06F 16/284 |
| 10,769,134 B2* | 9/2020 | Antonopoulos | G06F 16/2365 |
| 10,783,076 B1* | 9/2020 | McConnell | G06F 16/24552 |
| 11,119,990 B1* | 9/2021 | Chhawacharia | G06F 16/211 |
| 11,221,788 B2* | 1/2022 | Jin | G06F 12/0292 |
| 11,328,081 B2* | 5/2022 | Upadhyay | H04L 63/101 |
| 11,520,796 B2 | 12/2022 | Edara et al. | |
| 2003/0005228 A1* | 1/2003 | Wong | G06F 12/0811 |
| | | | 711/E12.024 |
| 2004/0128346 A1* | 7/2004 | Melamed | H04L 67/5682 |
| | | | 707/E17.12 |
| 2004/0249682 A1* | 12/2004 | DeMarcken | G06Q 10/02 |
| | | | 707/E17.081 |
| 2005/0192995 A1* | 9/2005 | Li | G06F 16/23 |
| 2008/0086469 A1* | 4/2008 | Gu | G06F 16/27 |
| 2008/0247313 A1* | 10/2008 | Nath | H04Q 9/00 |
| | | | 370/231 |
| 2013/0073821 A1* | 3/2013 | Flynn | G11C 16/06 |
| | | | 711/E12.103 |
| 2013/0346249 A1* | 12/2013 | Li | G06F 16/951 |
| | | | 705/26.61 |
| 2014/0025872 A1* | 1/2014 | Flynn | G06F 3/0643 |
| | | | 711/103 |
| 2014/0279881 A1* | 9/2014 | Tan | G06F 16/23 |
| | | | 707/613 |
| 2014/0281119 A1* | 9/2014 | Hyun | G06F 12/0646 |
| | | | 711/102 |
| 2015/0032725 A1* | 1/2015 | Barykin | G06F 16/2246 |
| | | | 707/722 |
| 2015/0161266 A1* | 6/2015 | Conradt | G06F 16/9535 |
| | | | 707/706 |
| 2016/0011996 A1* | 1/2016 | Asaad | G06F 9/3885 |
| | | | 710/308 |
| 2016/0103838 A1* | 4/2016 | Sainani | G06F 16/24 |
| | | | 707/725 |
| 2017/0116271 A1 | 4/2017 | Ziauddin et al. | |
| 2017/0161358 A1* | 6/2017 | Tadeski | G06F 16/2365 |
| 2018/0024901 A1* | 1/2018 | Tankersley | G06Q 10/06393 |
| | | | 707/694 |
| 2018/0121494 A1* | 5/2018 | Antonopoulos | G06F 16/2365 |
| 2018/0150503 A1* | 5/2018 | Horii | G06F 11/3419 |
| 2018/0349431 A1* | 12/2018 | Garcia Tellez | G06F 16/23 |
| 2019/0147092 A1* | 5/2019 | Pal | H04L 67/125 |
| | | | 707/713 |
| 2019/0147363 A1* | 5/2019 | Maheshwari | G06N 20/00 |
| | | | 709/224 |
| 2019/0155925 A1* | 5/2019 | Giannikis | H03M 7/00 |
| 2019/0258632 A1* | 8/2019 | Pal | G06F 16/2455 |
| 2019/0361885 A1* | 11/2019 | Duffield | G06F 16/2477 |
| 2020/0356578 A1* | 11/2020 | Frieder | G06N 20/00 |
| 2021/0149788 A1* | 5/2021 | Downie | G06F 11/3604 |

OTHER PUBLICATIONS

Jensen et al., "Time Series Management Systems: A Survey", IEEE Transactions On Knowledge and Data Engineering, vol. 29, No. 11, Aug. 17, 2017, pp. 2581-2600.
Notice of Grant from counterpart Chinese Application No. 202180042569.2 dated Jun. 30, 2023, 19 pp.
Qiulin et al., "Design of a storage system for unstructured data query optimization", Electronic Design Engineering, Jul. 5, 2017, vol. 13, 5 pp.
Response to Communication Pursuant to Rules 161(1) and 162 EPC dated Nov. 22, 2022, from counterpart European Application No. 21722724.8, filed May 19, 2023, 22 pp.
Roy et al., "Don't Trash your Intermediate Results, Cache 'em", arXiv:cs/0003005v1, Mar. 2, 2000, 22 pp.
Ta-Shma et al., "An Ingestion and Analytics Architecture for IoT Applied to Smart City Use Cases", IEEE Internet of Things Journal, vol. 5, No. 2, Apr. 1, 2018, pp. 765-774.
Yang et al., "Druid: A Real-time Analytical Data Store", Proceedings of The 2014 Acm Sigmod International Conference On Management of Data, Jan. 1, 2014, 12 pp.
Zaharia et al., "Spark: Cluster Computing with Working Sets", USENIX, May 27, 2010, 7 pp.
Prosecution History from U.S. Appl. No. 16/848,833, now issued U.S. Pat. No. 11,520,796, dated Dec. 24, 2021, through Aug. 8, 2022, 46 pp.
Cipar et al., "LazyBase : trading freshness for performance in a scalable database", Proceedings of the 7th ACM european conference on Computer Systems, Apr. 10, 2012, 14 pp.
Communication pursuant to Article 94(3) EPC from counterpart European Application No. 21722724.8 dated May 28, 2025, 13 pp.

* cited by examiner

MANAGING REAL TIME DATA STREAM PROCESSING

CROSS REFERENCE TO RELATED APPLICATIONS

This U.S. patent application is a divisional of, and claims priority under 35 U.S.C. § 121 from, U.S. patent application Ser. No. 16/848,833, filed on Apr. 14, 2020. The disclosure of this prior application is considered part of the disclosure of this application and is hereby incorporated by reference in its entirety.

TECHNICAL FIELD

This disclosure relates to managing real time data stream processing.

BACKGROUND

As applications today generate significant amounts of data, analytical tools have become more powerful. In other words, these analytical tools may pull from a rich depth of data to support their function. With vast amounts of data behind them, analytical tools such as dashboards, real-time alerts, and other data visualizations are being deployed by users more often to understand their data. With this increased use, some analytical tools demand minimal latency while hoping to analyze real-time or near real-time data. Since the data supporting these tools are often stored in distributed systems (e.g., cloud storage), these distributed storage systems are addressing ways to meet these demands especially when the data they store may arrives as a continuous data stream.

SUMMARY

One aspect of the disclosure provides a method for managing data processing. The method includes receiving, at data processing hardware, from a user of a data query system, a data query for data stored in a data store in communication with the data query system. The method also includes receiving, at the data processing hardware, a staleness parameter indicating an upper time boundary for the data query, the upper time boundary limiting a query response to data within the data store that is older than the upper time boundary. The method further includes determining, by the data processing hardware, whether the data stored within the data store satisfies the staleness parameter. When a portion of the data within the data store fails to satisfy the staleness parameter, the method includes generating, by the data processing hardware, the query response that excludes the portion of the data that has been written to the data store more recently than the upper time boundary of the staleness parameter.

Implementations of the disclosure may include one or more of the following optional features. In some implementations, receiving the staleness parameter includes receiving the staleness parameter from the user of the data query system. The method may include determining, by the data processing hardware, the upper time boundary for the staleness parameter by receiving user data from the user, ingesting the received user data into the data store to form one or more log files at a first time, converting the one or more log files into a columnar data format at a second time, the columnar data format optimized for a respective query, determining a time difference between the first time and the second time, and assigning the time difference to the upper time boundary for the staleness parameter.

In some examples, the method includes identifying, by the data processing hardware, log files for the data stored within the data store and determining, by the data processing hardware, a respective timestamp within the log files that most closely matches the upper time boundary of the staleness parameter. In this example, each log file includes a plurality of rows of data, each row of data of the plurality of rows of data includes a timestamp. Also in this example, for the query response, the method includes reading, by the data processing hardware, data within the log files that is older than the timestamp that most closely matches the upper time boundary of the staleness parameter. Here, the timestamp may indicate a time that the data store generated the respective row of data in a respective log file.

In some configurations, the method includes receiving, at the data processing hardware, a set of data from the user, ingesting, by the data processing hardware, the set of data into the data store, and generating, by the data processing hardware, one or more log files for the set of data. In this configuration, each log file includes rows of data corresponding to data from the set of data and generating the one or more log files generates a timestamp for each row of data within a respective log file.

Another aspect of the disclosure provides a method for managing data processing. The method includes receiving, at data processing hardware, a query requesting data stored in a storage system for a respective time interval. The method also includes determining, by the data processing hardware, whether any portion of the respective time interval corresponds to static data cached from a previous query. The static data corresponds to stored data that remains unchanged during storage operations of the storage system. When a portion of the respective time interval corresponds to static data cached from a previous query, the method includes generating, by the data processing hardware, a respective response to the query including the cached static data corresponding to the portion of the respective time interval without executing read operations on the storage system for stored data within the portion of the respective time interval.

This aspect may include one or more of the following optional features. In some implementations, the method includes receiving, at the data processing hardware, an initial query requesting data stored in the storage system for an initial time interval, determining, by the data processing hardware, that a portion of the data stored in the storage system for the initial time interval comprises static data, generating, by the data processing hardware, a response to the initial query comprising the requested data and including the portion of data corresponding to the respective static data for the initial time interval, and caching, by the data processing hardware, the portion of the data corresponding to static data for the initial time interval. Here, determining that the portion of the data stored in the storage system for the initial time interval includes static data may include identifying timestamps associated with a columnar format for the data stored in the storage system, the timestamps indicating a last modification date for the stored data in a given column. Optionally, determining that the portion of the data stored in the storage system for the initial time interval includes static data may include determining that a timestamp associated with a given column of stored data in the storage system satisfies a static data threshold, the timestamp indicating a last modification date for the stored data in the given column, the static data threshold indicating a likelihood that the stored data in the given column remains unchanged during future storage operations of the storage system.

In some configurations, generating the respective response to the query includes executing read operations on the storage system for stored data within the respective time interval, but not within the portion of the respective time interval corresponding to the static data cached from the previous query. When any portion of the respective time interval fails to correspond to static data cached from a previous query, the method may include determining, by the data processing hardware, that a portion of the data stored in the storage system for the respective time interval includes static data. Here, the method may also include generating, by the data processing hardware, the respective response to the respective query including the requested data and including the portion of data corresponding to the respective static data for the respective time interval and caching, by the data processing hardware, the portion of the data corresponding to static data for the respective time interval.

In some examples, the storage operations include storing a continuous data stream of real-time data from a user of the storage system. The method may include communicating, by the data processing hardware, the respective response to the query to a data analytics system, the data analytics system configured to generate a graphical representation for the respective response.

Another aspect of the disclosure provides a system for managing data processing. The system includes data processing hardware and memory hardware in communication with the data processing hardware. The memory hardware stores instructions that when executed on the data processing hardware cause the data processing hardware to perform operations. The operations include receiving from a user of a data query system, a data query for data stored in a data store in communication with the data query system. The operations also include receiving a staleness parameter indicating an upper time boundary for the data query. The upper time boundary limits a query response to data within the data store that is older than the upper time boundary. The operations also include determining whether the data stored within the data store satisfies the staleness parameter. When a portion of the data within the data store fails to satisfy the staleness parameter, the operations include generating the query response that excludes the portion of the data that has been written to the data store more recently than the upper time boundary of the staleness parameter.

Implementation of this aspect of the disclosure may include one or more of the following optional features. In some implementations, receiving the staleness parameter includes receiving the staleness parameter from the user of the data query system. The system may include determining the upper time boundary for the staleness parameter by receiving user data from the user, ingesting the received user data into the data store to form one or more log files at a first time, converting the one or more log files into a columnar data format at a second time, the columnar data format optimized for a respective query, determining a time difference between the first time and the second time, and assigning the time difference to the upper time boundary for the staleness parameter.

In some examples, the system includes identifying log files for the data stored within the data store, determining a respective timestamp within the log files that most closely matches the upper time boundary of the staleness parameter, and for the query response, reading data within the log files that is older than the timestamp that most closely matches the upper time boundary of the staleness parameter. In this example, each log file includes a plurality of rows of data, each row of data of the plurality of rows of data comprising a timestamp. Here, the timestamp may indicate a time that the data store generated the respective row of data in a respective log file.

In some configurations, the system includes receiving a set of data from the user, ingesting the set of data into the data store, generating one or more log files for the set of data. In this configuration each log file includes rows of data corresponding to data from the set of data and generating the one or more log files generates a timestamp for each row of data within a respective log file.

Yet another aspect of the disclosure provides a system for managing data processing. The system includes data processing hardware and memory hardware in communication with the data processing hardware. The memory hardware stores instructions that when executed on the data processing hardware cause the data processing hardware to perform operations. The operations include receiving a query requesting data stored in a storage system for a respective time interval. The operations also include determining whether any portion of the respective time interval corresponds to static data cached from a previous query. The static data corresponds to stored data that remains unchanged during storage operations of the storage system. When a portion of the respective time interval corresponds to static data cached from a previous query, the operations include generating a respective response to the query including the cached static data corresponding to the portion of the respective time interval without executing read operations on the storage system for stored data within the portion of the respective time interval.

Implementation of this aspect of the disclosure may include one or more of the following optional features. In some examples, the system includes receiving an initial query requesting data stored in the storage system for an initial time interval, determining that a portion of the data stored in the storage system for the initial time interval includes static data, generating a response to the initial query including the requested data and including the portion of data corresponding to the respective static data for the initial time interval, and caching the portion of the data corresponding to static data for the initial time interval. Here, determining that the portion of the data stored in the storage system for the initial time interval includes static data may include identifying timestamps associated with a columnar format for the data stored in the storage system, the timestamps indicating a last modification date for the stored data in a given column. Optionally, determining that the portion of the data stored in the storage system for the initial time interval may include static data includes determining that a timestamp associated with a given column of stored data in the storage system satisfies a static data threshold, the timestamp indicating a last modification date for the stored data in the given column, the static data threshold indicating a likelihood that the stored data in the given column remains unchanged during future storage operations of the storage system.

In some configurations, generating the respective response to the query includes executing read operations on the storage system for stored data within the respective time interval, but not within the portion of the respective time interval corresponding to the static data cached from the previous query. When any portion of the respective time interval fails to correspond to static data cached from a previous query, the system may include determining that a portion of the data stored in the storage system for the respective time interval includes static data, generating the respective response to the respective query including the requested data and including the portion of data corresponding to the respective static data for the respective time interval, and caching the portion of the data corresponding to static data for the respective time interval. The storage operations may include storing a continuous data stream of real-time data from a user of the storage system. The system may include communicating the respective response to the query to a data analytics system, the data analytics system configured to generate a graphical representation for the respective response.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
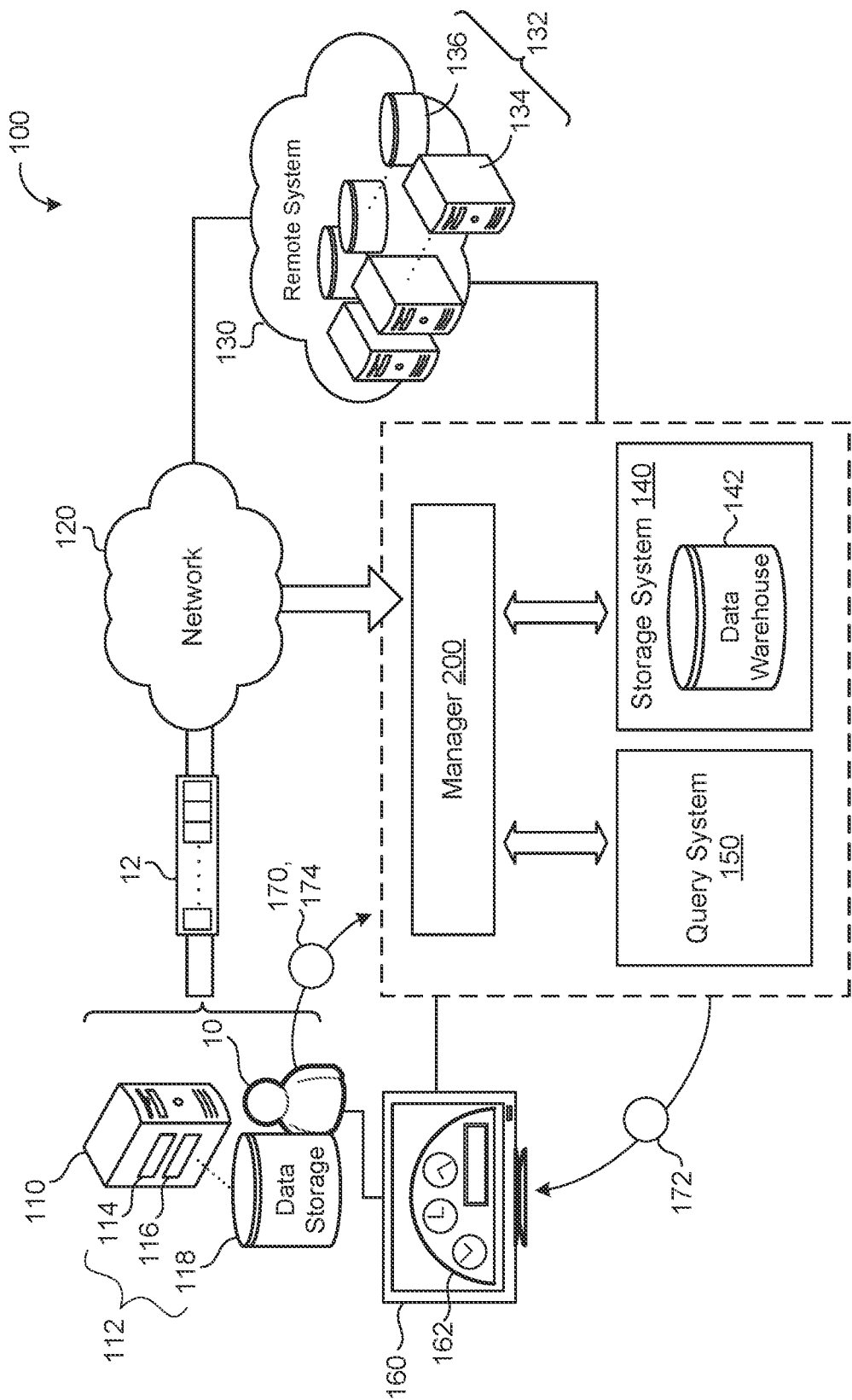
FIG. 1 is a schematic view of an example data management environment.

Real-time applications produce a significant amount of data in real-time and push this data to data warehouses for storage and to perform future data analytics. For instance, some applications may generate dashboards (i.e., visual analytics), real-time alerts, or other analytics based on the data stored in data warehouses. When queries occur related to the data stored in data warehouses, these queries often demand minimal latency to enable the dashboards, or other analytics operating based on the data, to convey accurate information. It is not uncommon for this query process to perform queries in a matter of milliseconds. Accordingly, the goal of query-enabled data storage systems is that data in the data warehouse is in a format capable of being queried as soon as possible.

Typically, when applications run fast queries, these applications tend to use a technique called columnar data management. Generally, data arrives at a storage system for ingestion in row-oriented format. For the technique of columnar data management, the data in row-oriented format needs to be transposed into a columnar format. To transpose a row-oriented format into a columnar format is a processor intensive process (i.e., a high demand on processing resources, such as CPUs). Moreover, the data ingestion process itself is a processor intensive process. Since both types of processing are resource intensive, ingestion systems do not want to tax resources to potentially cause ingestion issues (i.e., issues when storage systems are receiving data). As such, columnar data management techniques transpose data after it has been ingested in the row-oriented format. Since columnar data management occurs subsequent to ingestion, storage systems aim to ingest data as quickly as possible to enable columnar data management to occur soon thereafter. Based on this approach, storage systems receive the most recent user data in a row-oriented format and write the received data into a persistent storage portion of a storage system. Then a background process converts the stored data into a query-friendly format so that queries on the stored data may be optimized to occur quickly.

Ideally, when the storage system receives a query, the storage system would prefer the query to involve stored data that is already in the query-friendly format (e.g., also referred to as a query-optimized format). Otherwise, if the query involves stored data that has yet to be converted into the query-optimized format, the query may incur latency. For instance, when a query involves stored data that is not in the query-optimized format, the read time for the query increases due to the non-query-optimized form of the stored data. In other words, data in the query-optimized format has been optimized to reduce the read time of the non-query optimized format. Therefore, by demanding a query on the most recent data ingested by a storage system, the query process is inherently subject to additional read time by reading data in the non-query-optimized format (e.g., row-oriented format).

In one approach to overcome potential latency issues and/or to optimize data queries, a query-based storage system may optimize queries to avoid, if possible, querying data stored in the non-query-optimized format. In other words, due to the nature of storage systems and the timing it takes to convert ingested data into query-optimized format, a query may be constrained to read only stored data in the query-optimized format or to maximize the amount of data read in the query-optimized format. For instance, a storage system processes real-time streaming data from head to tail. Since streaming data may be continuous, the stream of data itself is often referred to by portions of the data stream. Here, the head refers to a beginning of the data stream or a designated beginning reference point in the data stream while the tail refers to the data of the data stream that is being generated currently. Therefore, the head of the data is inherently older data than, for example, brand new data at the tail. For simplicity, with respect to query-based storage systems, the head of the data refers to the portion of the data that has been both ingested by the storage system and converted into a query-optimized format while the tail refers to the freshest or most recent data that is either being ingested or has been ingested, but not yet converted into a query-optimized format. Here, the query system would minimize latency if the query system constrained the query to data from the head (e.g., already fully processed and in a query-optimized form) and excluded data from the tail.

Excluding data from the tail is a type of staleness approach to data query optimization. A staleness approach allows a user to permit (e.g., specify or to agree to) an acceptable amount of staleness with respect to the results of data queries. In other words, a user may indicate to a query system that a query on the user's data does not need to review the most recent five minutes of data (e.g., data from the tail of the data stream). Here, this five minutes indicates that the user is content having the results of their query five minutes stale (i.e., missing the most recent five minutes of results). In this example, the user's query focuses on data greater than five minutes ago. This approach is a trade-off between query latency and staleness. Stated differently, if a user permits some specified degree of staleness (e.g., the five minutes), his or her query will occur with less latency because the query system does not need to respond with information regarding the most recent data (e.g., within the five minutes). The staleness therefore indicates a user's tolerance for a query response regarding slightly older data (i.e., not the most recent data) in order for the query system to provide a faster response to a query from the user.

Although a query-based storage system would ideally try to avoid increased read times from querying data in a non-query optimized format, this is not always possible. For instance, a user or a user's analytics may demand queries on the most recently stored data that is still in a non-query optimized format. Therefore, another approach to query system optimization is query caching. Query caching may be used in conjunction with a staleness approach or as an alternative to a staleness approach. Query caching centers around the idea that even though a query may need to read some degree of data stored in a non-query optimized format, the query can further decrease query time related to queried data stored in the query-optimized format by caching.

Query caching generally operates on the principle that a large portion of the data being requested by a query remains unchanged. This may be used to the advantage of a query system when often queries for query-based storage systems happen on a routine basis. For instance, data queries that support user analytics are set up to periodically occur in order to maintain a relatively up-to-date analytical tool. As an example, a user dashboard is configured to represent the last ninety days of data related to the user in the data store. Therefore, the user programs a query to run at some particular frequency to retrieve the last ninety days of data in order to populate the user's dashboard with the actual data for the last ninety days. Yet over the last ninety days, the stored data for a majority of this ninety-day time period remains unchanged (e.g., eighty-eight of the ninety days remains unchanged). This means that typically only a small portion of the ninety days of data is changing. For example, only the last day or two of data is changing. In other words, as new data is being ingested by the storage system, this new data (e.g., the last two days) will be new for the user's analytics because it was not previously represented. In contrast, previously represented data (e.g., the previous eighty-eight days) remains predominantly unchanged. Here, the query system can leverage the frequency of the routine, ninety-day query and the simple principal that storing new, real-time streaming data minimally affects a majority of data subject to the query. When the query generates the results for the last ninety days, it may cache the results of the query. By caching the results, a subsequent query can avoid reading stored data that already exists in the cache of the previous query. With this approach, the current query may have to read the most recent data in non-query optimized form (e.g., the last two days), but avoid reading a large chunk of the stored data altogether (e.g., even though it is in a query-optimized form). By employing either the staleness approach, the query caching approach, or some combination of both, overall query time for a query system may be reduced.

FIG. 1 illustrates an example of a data management environment 100. A user device 110 associated with a user 10 generates user data 12 during execution of its computing resources 112 (e.g., data processing hardware 114 and/or memory hardware 116). For example, the user 10 uses real-time applications operating on data processing hardware 114 of the user device 110 to generate the user data 12. Real-time applications typically refer to applications or programs that the user 10 interprets or generally perceives as immediate or current. Because real-time applications strive to be current, they often demand low latency for the execution time to perform tasks or a set of tasks using the computing resources (e.g., computing resources 112). Some examples of real-time applications include videoconferencing applications, community storage applications, electronic commerce transactions, and other applications functioning with real-time communication. Since real-time applications have the ability to generate large amounts of user data 12, the user 10 often utilizes other systems (e.g., a remote system 130, a storage system 140, a query system 150, or an analytics system 160) for user data storage and/or user data management.

In some examples, the user device 110 is a local device (e.g., associated with a location of the user 10) that uses its own computing resources 112 with the ability to communicate (e.g., via the network 120) with one or more remote systems 130. Additionally or alternatively, the user device 110 leverages its access to remote resources (e.g., remote computing resources 132) to operate applications for the user 10. User data 12 generated through the use of the user device 110 may be initially stored locally (e.g., such as in data storage 118 of the memory hardware 116) and then communicated to a remote system 130 or sent upon creation through a network 120 to the remote system 130. For example, the user device 110 communicates the user data to a storage system 140 using the remote system 130.

In some examples, the user 10 utilizes the computing resources 132 of the remote system 130 (e.g., a cloud computing environment) for storage of the user data 12. In these examples, the remote system 130 may receive streaming user data 12 as it is being generated by various user applications. Here, a data stream (e.g., of the user data 12) refers to a continuous or generally continuous feed of data arriving at the remote system 130 for storage and/or further processing. In some configurations, instead of continuously streaming user data 12 to the remote system 130, the user 10 and/or the remote system 130 configures the user data 12 to be sent at frequent intervals such that the remote system 130 has a constant supply of user data 12 to process. Much like the user device 110, the remote system 130 includes computing resources 132 such as remote data processing hardware 134 (e.g., server and/or CPUs) and memory hardware 136 (e.g., disks, databases, or other forms of data storage).

In some configurations, the remote computing resources 132 are resources utilized by various systems associated and/or communicating with the remote system 130. As shown in FIG. 1, these systems may include a storage system 140, a query system 150, and/or an analytics system 160. In some examples, the functionality of these systems 140, 150, 160 may be integrated together in different permutations (e.g., built-on each other) or separate systems with the ability to communicate with each other. For example, the storage system 140 and the query system 150 may be combined into a single system (e.g., as shown by the dotted line around these systems in FIG. 1). The remote system 130 with its computing resources 132 may be configured to host one or more functions of these systems 140, 150, 160. In some implementations, the remote system 130 is a distributed system whose computing resources 132 are distributed across one or more locations accessible via the network 120.

In some examples, the storage system 140 is configured to operate a data warehouse 142 (e.g., a data store and/or a plurality of databases) as a means of data storage for the user 10 (or multiple users). Generally speaking, a data warehouse 142 stores data from one or more sources and may be designed to analyze, report, and/or integrate data from its sources. A data warehouse 142 enables users (e.g., organizational users) to have a central storage depository and storage data access point. By containing user data 12 in a central depository such as a data warehouse 142, the data warehouse 142 may simplify data retrieval for functions such as data analysis and/or data reporting (e.g., by the analytics system 160). Furthermore, data warehouses 142 may be configured to store a significant amount of data such that a user 10 (e.g., an organizational user) can store large amounts of historical data to understand data trends. Being that data warehouses 142 may be the main or sole data storage depository for a user's data 12, the storage system 140 may often be receiving large amounts of data (e.g., gigabytes per second, terabytes per second, or more) from user devices 110 associated with the user 10. Additionally or alternatively, as a storage system 140, the storage system 140 and/or storage warehouse 142 may be configured for data security (e.g., data redundancy), for multiple users from a single data source (e.g., multiple employees of an organization), and/or for simultaneous multi-user access. In some configurations, the data warehouse 142 is persistent and/or non-volatile such that data, by default, is not overwritten or erased by new incoming data.

The query system 150 is configured to request information or data from the storage system 140 in the form of a query 170. In some examples, the query 170 is initiated by the user 10 as a request for user data 12 within the storage system 140. For instance, the user 10 operates through the query system 150 (e.g., an interface associated with the query system 150) to retrieve user data 12 being stored in the data warehouse 142 of the storage system 140. Here, the query 170 may be user-originated (i.e., directly requested by the user 10) or system-originated (i.e., configured by the query system 150 itself). In some examples, the query system 150 configures routine or repeating queries 170 (e.g., at some designated frequency) to allow the user 10 to perform analytics or to monitor user data 12 stored in the storage system 140.

The format of a query 170 may vary, but may include a reference to specific user data 12 stored in the storage system 150 and/or request user data 12 for a particular period of time. For instance, the query 170 requests the previous seven days of user data 12. In some configurations, the user 10 sends user data 12 to the storage system 140 in a particular format such that the query system 150 may generate queries 170 based on information regarding the particular format (e.g., using attributes of the format). For example, data storage systems 140 receive user data 12 in a table format where the user data 12 populates rows and columns of a table. With a table format, the user data 12 within the table may have rows and columns that correspond to schemas or headings associated with the user data 12. For example, the user data 12 may refer to commercial transactions made by the user 10. In this example, the user data 12 may include columns for a seller, a buyer, a transaction price, a transaction quantity, and other transactional data that the user 10 gathers regarding its transactions. Here, each row may have a heading or schema, such as a transaction number or identifier and/or a time entry associated with the transaction. Since the storage system 140 may receive the user data 12 in a particular format (e.g., the transaction table format), the storage system 140 is configured to store the user data 12 such that elements of the format (e.g., relationships, headings, or other schema) associated with the user data 12 (e.g., providing further context or definition to the user data 12) are accessible to the query system 150. In other words, the query system 150 generates a query 170 that requests the previous seven days of transactions prices.

In response to a query 170, the query system 140 generates a query response 172 fulfilling or attempting to fulfill the request of the query 170 (e.g., a request for particular user data 12). Generally speaking, the query response 172 includes user data 12 that the query system 150 requests in the query 170. The query system 150 may return this query response 172 to an entity that originates the query 170 (e.g., the user 10) or another entity or system communicating with the query system 150. For example, the query 170 itself or the query system 150 may specify that the query system 150 communicates one or more query responses 172 to a system associated with the user 10, such as an analytics system 160. For instance, a user 10 uses an analytics system 160 to perform analytics on user data 12. The analytics system 160 may be configured to generate reports, alerting, graphical representations of the data (e.g., the dashboard 162), or other data-based visualizations. In order to generate these analytics on the user data 12, the analytics system 160 may function in conjunction with the query system 150 to retrieve the user data 12 underlying the analytics (e.g., originating or configuring queries 170 on behalf of the user 10). Often, query systems 150 are set up to generate routine queries 170 on the user data 12 within the storage system 140 to enable an analytics system 160 to perform its analytics (e.g., at particular frequencies). For example, the query system 150 executes a daily query 170 to pull the last seven days of transaction data for the analytics system 160 to analyze and/or to represent. Here, in FIG. 1, the dashboard 162 represents an example of how the analytics system 160 may express user data 12 received in a query response 172 from the query system 150.

Referring further to FIG. 1, the data management environment 100 also includes a manager 200. The manager 200 is generally configured to optimize query-based data storage. The manager 200 may perform this optimization by executing and/or coordinating operations related to systems 140, 150, 160 for the user 10 (e.g., storage operations, query operations, and/or data-analytics operations). The functionality of the manager 200 may be centralized (e.g., reside in one of the systems 140, 150, 160) or distributed among the systems 140, 150, 160 depending on its design. In some examples, such as FIG. 1, the manager 200 is configured to receive user data 12 from the user 10 and to facilitate storage operations at the storage system 140. For instance, the manager 200 ingests the user data 12 upon receipt and may translate the user data 12 into a query-optimized format. Here, ingestion refers to obtaining and/or importing the user data 12 into the storage system 140 (e.g., into the data warehouse 142) to allow system(s) to use the ingested user data (e.g., by query systems 150 and/or analytic systems 160). Generally speaking, data can be ingested in real-time where the manager 200 imports the data as it is being emitted from the source (e.g., the user 10 or user devices 110 of the user 10) or in batches where the manager 200 imports discrete chunks of data a periodic intervals of time. During ingestion, the manager 200 may validate a format of the user data 12 (e.g., to comply with acceptable formats for the storage system 140) and route the user data 12 to the data warehouse 142 (e.g., particular data storage locations in the data warehouse 142 designated for user data 12 of the user 10). Oftentimes, data ingestion may be challenging for streaming data especially when data storage systems 140 attempt to optimize data received for other operations (e.g., querying). Here, the functionality of the manager 200 supports streaming data and, more particularly, facilitates aspects of data management that optimize streaming data for query-based operations during storage. For instance, the manager 200 integrates either the staleness approach, the query caching approach, or some combination of both, to reduce overall query time for stored user data 12.

Figure 2A:
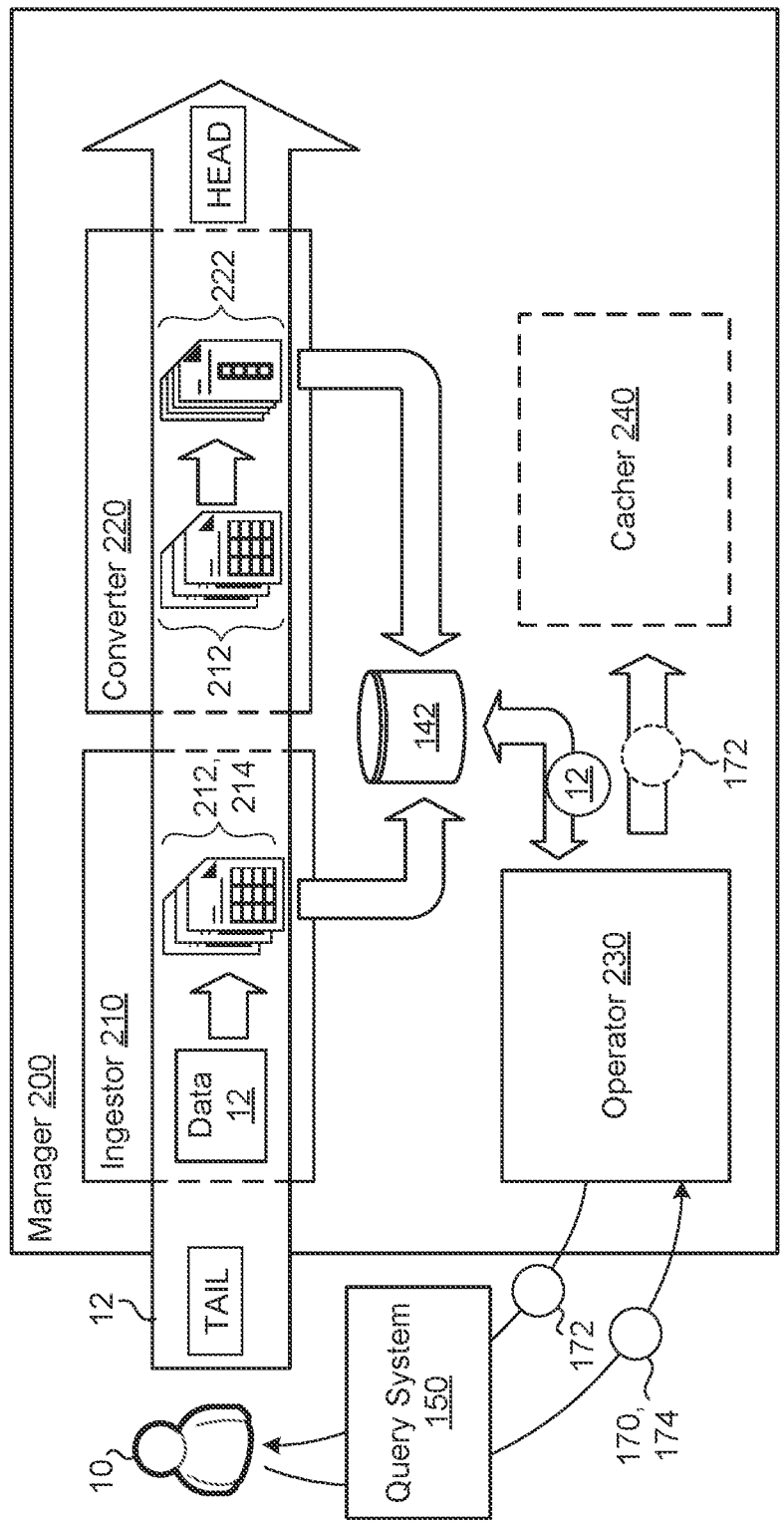
FIG. 2A is a schematic view of an example data manager for the data management environment of FIG. 1.

Referring to FIGS. 2A-2F, the manager 200 includes an ingestor 210, a converter 220, and an operator 230. In configurations where the manager 200 uses the caching approach, the manager 200 also includes the cacher 240. For example, the cacher 240 is shown in FIG. 2A with a dotted outline to indicate that the manager 200 does not always employ the caching approach 240.

The ingestor 210 is configured to perform the ingestion process such that the ingestor 210 imports user data 12 into the data warehouse 142. As illustrated by FIG. 2A, the ingestor 210 may receive streaming user data 12 and process the user data 12 from head to tail to generate ingested user data referred to as log files 212. In some examples, while the ingestor 210 ingests the user data 12, the ingestor 210 associates a ingestion timestamp 214 with the user data 12. For instance, the ingestion timestamp 214 indicates a time when the ingestor 210 ingests (e.g., imports) each particular portion of the user data 12 into a log file 212. In some implementations, such as FIG. 2B, the ingestor 210 receives the user data 12 in a table format with rows and columns. When the ingestor 210 receives the user data 12 in a table format, the ingestor 210 is configured to generate log files 212 in a row-oriented format. In a row-oriented format, the ingestor 210 stores a given row R of data and all its column values together (e.g., in a contiguous fashion such that multiple column values of the row are adjacent). This row-oriented ingestion may aid in preserving schemas or headings corresponding to columns of a row in a particular relationship. For instance, returning to the transaction sales example discussed previously, by ingesting a given row R of data and all its column values together, a data storage format maintains the seller, buyer, transaction price, transaction quantity, and other transactional data together for a given commercial transaction. By ingesting user data 12 in a row-oriented format, the ingestor 210 may minimize the use of additional processing to alter the ingested format at the time of ingestion.

Figure 2B:
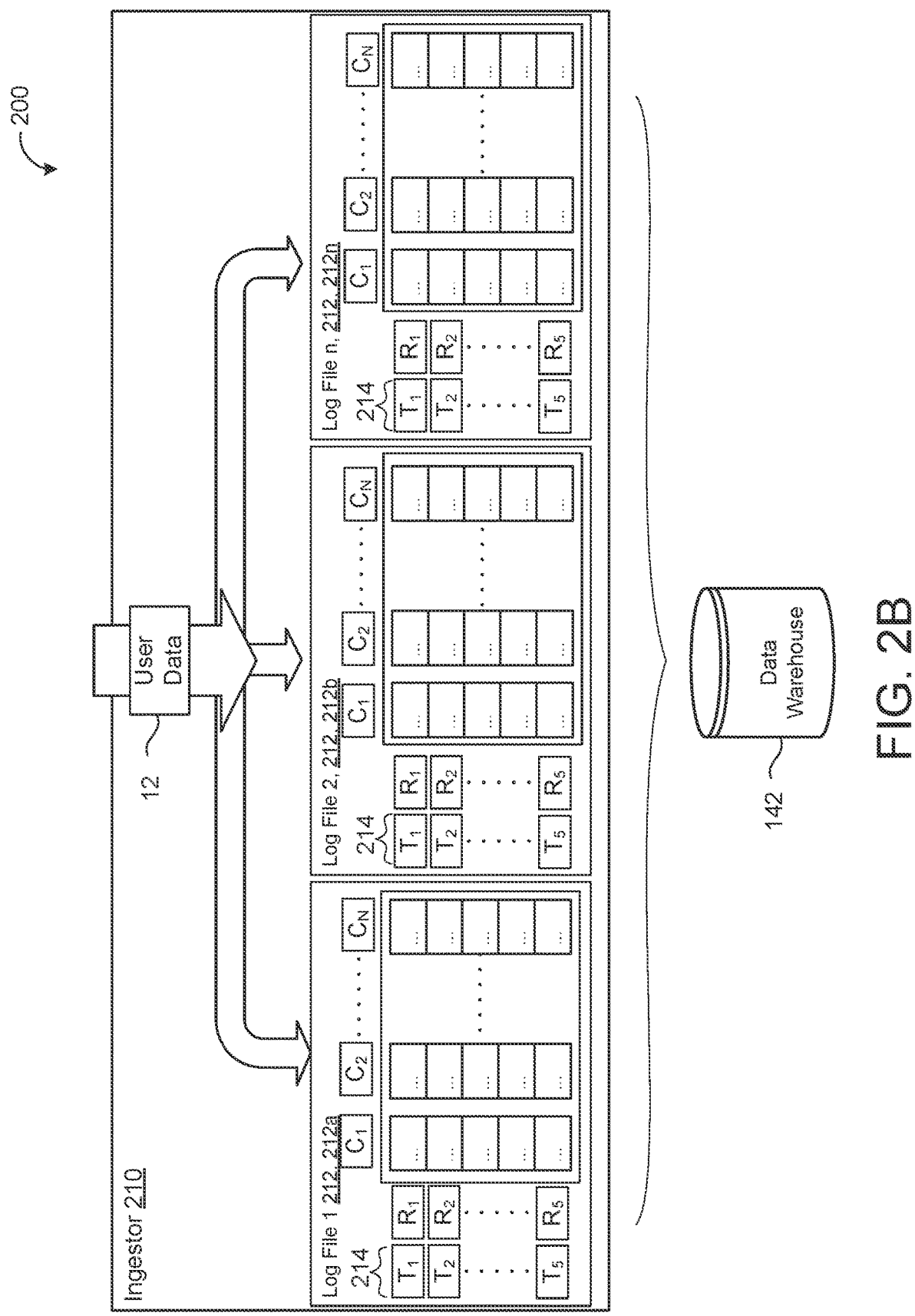
FIG. 2B is a schematic view of an example ingestor for the data manager of FIG. 2A.

Referring to FIG. 2B, the ingestor 210 ingests the user data 12 into a plurality of log files 212, 212a-n. As the ingestor 210 ingests user data 12, the ingestor 210 creates a log file 212 and transfers the user data 12 into rows $R_{1-n}$ of the log file 212. For instance, the user data 12 corresponds to the last fifteen minutes of user data 12 from a real-time application where the head of the user data 12 corresponds to fifteen minutes ago and the tail of the user data corresponds to the current time. When the ingestor 210 receives the head of the user data 12, the ingestor 210 creates the first log file 212, 212a and generates the first row $R_1$ of the first log file 212a with user data 12 from the first row of the user data 12. Here, each column $C_{1-n}$ of the log file 212 may be configured to match or to correspond to headings or schemas of the user data 12. When the ingestor 210 generates a row R of the log file 212, the ingestor 210 may also associate a timestamp 214, T of the current time (e.g., the time of ingestion for the row R) with the row R of user data 12 being generated in the log file 212. The size of each log file 212 may be determined based on preferences of the storage system 140 or the data warehouse 142. Once the ingestor 210 generates a log file 212 with a number of rows R of the user data 12 equal to a size capacity configured for a log file 212 (e.g., shown as five rows $R_{1-5}$), the ingestor 210 creates a new log file (e.g., the second log file 212, 212b) and continues ingesting the user data into the new log file 212. With a user data stream, the ingestor 210 continues this process of generating and transferring user data 12 to log files 212 as long as the user data stream continues. In batch processing, the ingestor 210 will repeat the process until the batch is complete and there is no more user data 21 to ingest.

In FIG. 2B, the ingestor 210 generates three log files 212, 212a-c. Here, for simplicity, if we assume that the user 10 is generating user data 12 at a constant rate, the ingestor 210 generates the first log file 212, 212a with the last eleven to fifteen minutes of user data 12, the second log file 212b with the last six to ten minutes of user data 12, and the third log file 212c with the last five minutes of user data 12. Once the ingestor 210 generates a log file 212 filled to capacity, the ingestor 210 communicates the full log file 212 to the storage system 140 for storage within the data warehouse 142.

Figure 2C:
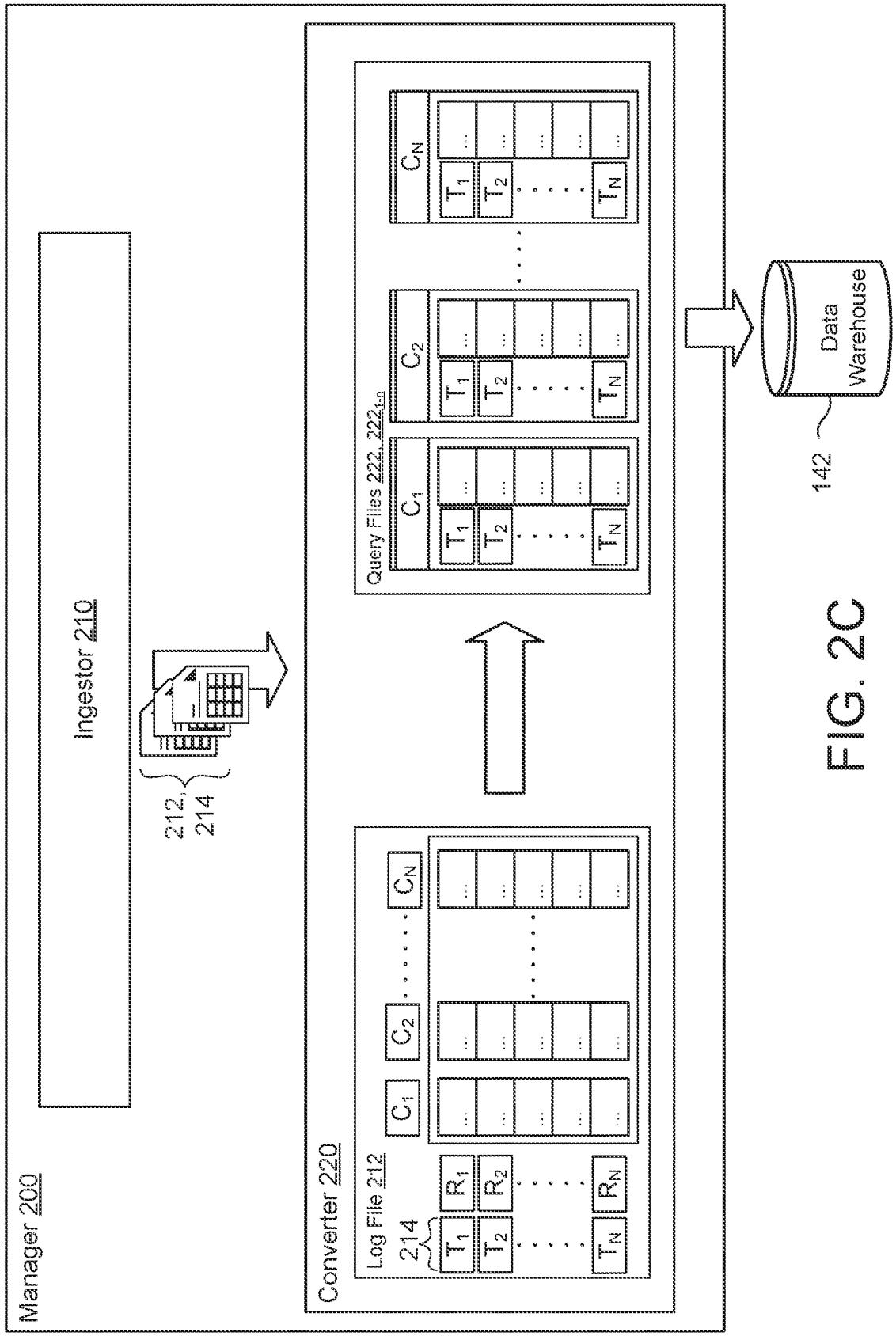
FIGS. 2C and 2D are schematic views of example converters for the data manager of FIG. 2A.
Figure 2D:
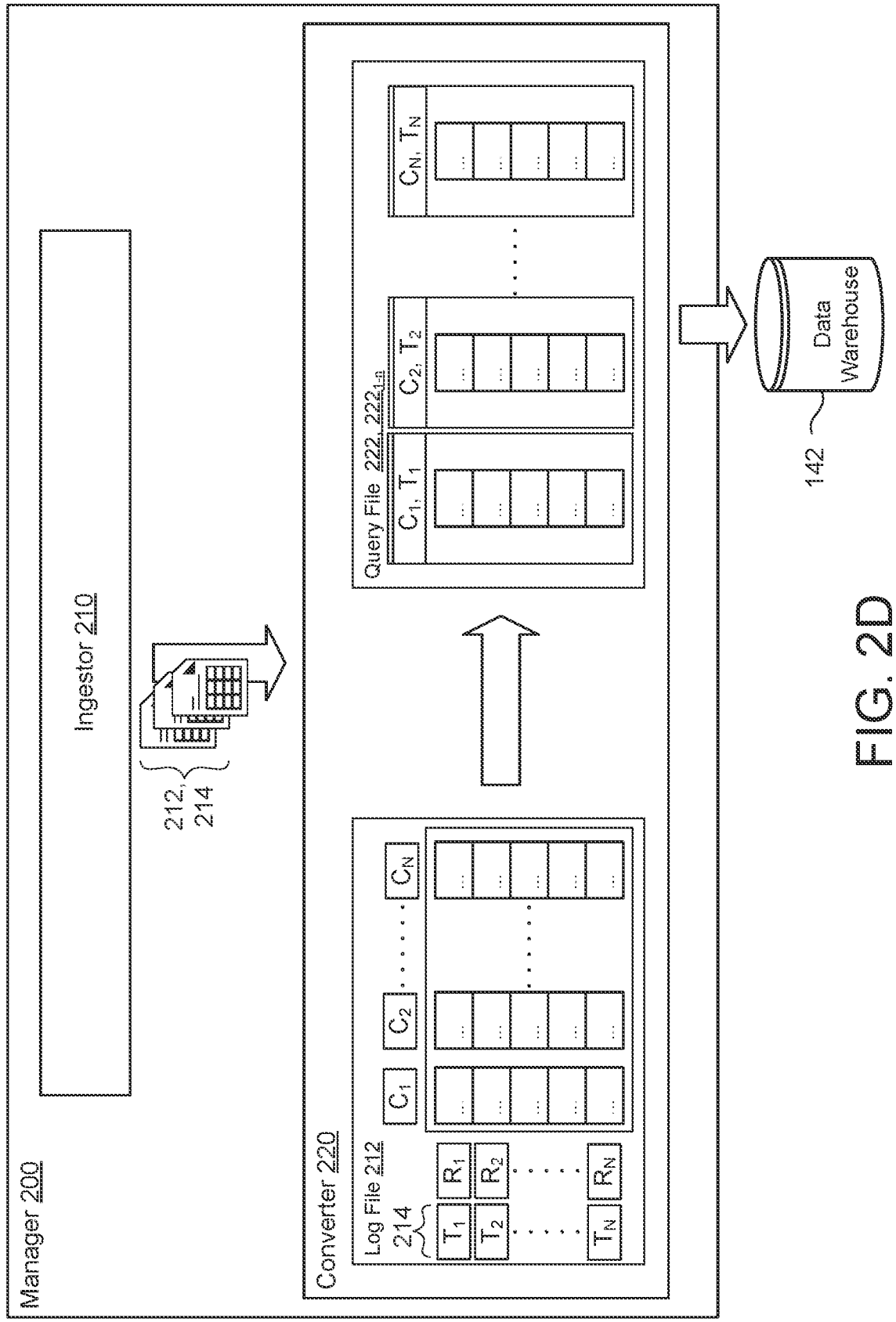

Referring to FIGS. 2A, 2C, and 2D, after ingestion by the ingestor 210, the converter 200 of the manager 200 converts user data 12 stored in the one or more log files 212 into one or more query files 222. Here, a query file 222 is in a format that is considered a query-optimized format because the read operations relating to a query 170 may be performed in less time on the query file 222 than on the log files 212. Moreover, real-time applications that generate streams of user data 12 may often find it convenient to generate data in a row-oriented database or table. Yet for queries and/or data analytics, it is typically the case that a columnar format is more compatible with queries and/or data analytics than a row-oriented format. For instance, a columnar format is more conducive to read operations (i.e., takes less time) than a row-oriented format because rows may have longer runs of data to read across a row. Furthermore, the columnar form of data inherently may group related data together (e.g., all buyers for transaction data) which may prevent read operations from reading data that does not need to be retrieved by a query 170. For example, a query 170 for buyers does not need to read seller data. Based on at least these reasons, in some examples, the query file 222 has a columnar data format.

Referring to FIGS. 2C and 2D, the converter 220 is shown generating query files 222, $222_{1-n}$ from the log files 212. In some implementations, all the rows $R_{1-n}$ for a single column C of a log file 212 are transferred to a data storage block (e.g., shown as data storage blocks labeled $C_{1-N}$) defining a query file 222. In some configurations, such as FIG. 2C, the converter 200 includes or transfers the ingestion timestamp 214 associated with each row R to the columnar storage block (e.g., shown as $T_1$-$T_n$). Additionally or alternatively, FIG. 2D illustrates that a query file 222 (e.g., a columnar block), may include other time values T that may be used during queries 170 to the storage system 140. For example, the time $T_{1-N}$ may refer to a local extremum value (e.g., a minima and/or maxima) with respect to the timestamp values within a query file 222. In another example, the time $T_{1-N}$ represents the last modification time for data entries within a query file 222. Here, when the time $T_{1-N}$ represents the last modification time for a column of user data 12, the cacher 230 may read this time T for the query file 222 to understand whether the query file 222 includes static data that has not changed (e.g., by ingestion or conversion) over some period of time.

Figure 2E:
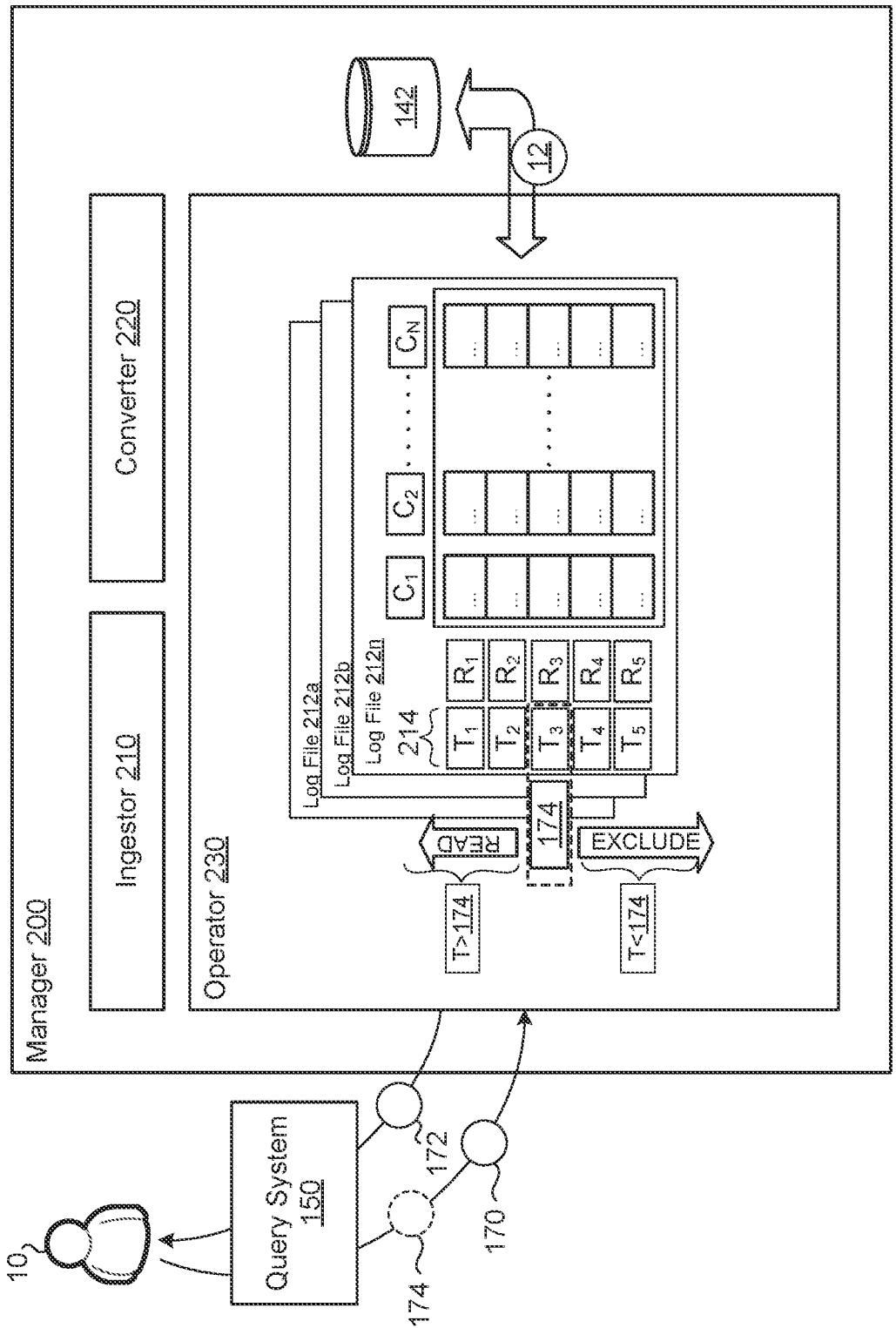
FIG. 2E is a schematic view of an example operator for the data manager of FIG. 2A.

Referring to FIG. 2E, the operator 230 of the manager 200 is configured to receive a query 170 from the query system 150 and respond to the query 170 with a query response 172.

In some examples, the operator 230 is also configured to implement the staleness approach to query optimization. For instance, the operator 230 receives a staleness parameter 174 from the user 10 or the query system 150. Here, the staleness parameter 174 refers to an upper time boundary for the query 170 where the upper time boundary limits the query response 172 to user data 12 within the data warehouse 142 that is older than the upper time boundary. The staleness parameter 174 may be configurable such that the staleness parameter 174 may be associated with a single query 170, with all queries 170 for a particular user 10, and/or with a particular set of queries 170 (e.g., repeating or scheduled queries 170).

FIG. 2E also illustrates the staleness parameter 174 with a dotted outline to indicate that the staleness parameter 174 does not necessarily need to originate from the user 10 or the query system 150. In some configurations, the operator 230 generates the staleness parameter 174. Although a staleness parameter 174 may potentially indicate how willing a user 10 is to the tradeoff between latency and staleness, the staleness parameter 174 ideally tries to have a query 170 avoid reading stored user data 12 in a non-query optimized format (e.g., a row-oriented format of a log file 212). Therefore, the operator 230 may determine its own staleness parameter 174. For example, the operator 230 and/or the manager 200 recommends a staleness parameter 174 to the user 10. The operator 230 may determine its own staleness parameter 174 by determining the time it takes from the point of ingestion for the user data 12 to the point of conversion of the log file 212 into the query file 222 at the converter 220. In some examples, the operator 230 utilizes the timestamps 214 generated during the ingestion process to determine when a log file 212 was ingested by the ingestor 210. For instance, timestamps 214 for the first row R (e.g., the first row $R_1$) and the last row R (e.g., the fifth row $R_5$) of a log file 212 generally estimate how long the ingestion process at the ingestor 210 took for a given log file 212. With this time, the operator 230 may use time values T associated with the conversion process of the converter 220 to determine how long the conversion process takes to convert a log file 212 into a query file 222. For example, the last modified time T is configured to indicate when converter 220 converted the log file 212 into the query file 222. Based on the timing for the ingestion process and the conversion process, the operator 230 generates a staleness parameter 174 greater than or equal to the time it takes to perform the ingestion and conversion processes. For example, the operator 230 assigns the total time to perform ingestion and conversion to the upper time boundary for the staleness parameter 174. In this approach, the staleness parameter 174 would generally guarantee that the user data 12 is in a query-optimized format for a query 170. Additionally or alternatively, the operator 230 may be configured to track or to monitor the time of ingestion and conversion on its own without relying on timestamps or time values associated with log files 212 and/or query files 222.

When the operator 230 either receives or generates the staleness parameter 174, the operator 230 is configured to determine whether user data 12 stored in the storage system 140 (e.g., the data warehouse 142) satisfies the staleness parameter 174. In some examples, the stored user data 12 satisfies the staleness parameter 174 when a timestamp 214 indicates a row R of user data 12 in a log file 212 is older than the upper time boundary for the staleness parameter 174. In implementations, as illustrated by FIG. 2E, the operator 230 identifies log files 212 in the data warehouse 142 that store user data 12 and determines a timestamp 214 within the log files 212 that matches or most closely matches the staleness parameter 174. In FIG. 2E, the operator 230 has determined that the timestamp 214, $T_3$ associated with the third row $R_3$ of user data 12 in the log file 212n most closely matches the staleness parameter 174. Based on this determination, the operator 230 is configured to exclude rows R with timestamps 214 older than the timestamp 214, $T_3$ associated with the third row $R_3$ from read operations responding to the query 170. For instance, FIG. 2E shows the operator 230 not performing read operations on the fourth row $R_4$ and the fifth row $R_5$ of the log file 212. For timestamps 214 older than the timestamp 214, $T_3$ associated with the third row $R_3$ (e.g., rows $R_{1-3}$), the operator 230 will perform read operations on the user data 12 within rows R associated with these older timestamps 214. In some configurations, the operator 230 only evaluates whether the timestamps 214 of log files 212 satisfy the staleness parameter 174 because log files 212 are in a non-query optimized format that inherently causes a query 170 to experience some degree of latency for querying data in a non-query optimized format. Therefore, this approach attempts to minimize the amount of read operations that need to be performed on user data 12 that has yet to be converted to query files 222.

Figure 2F:
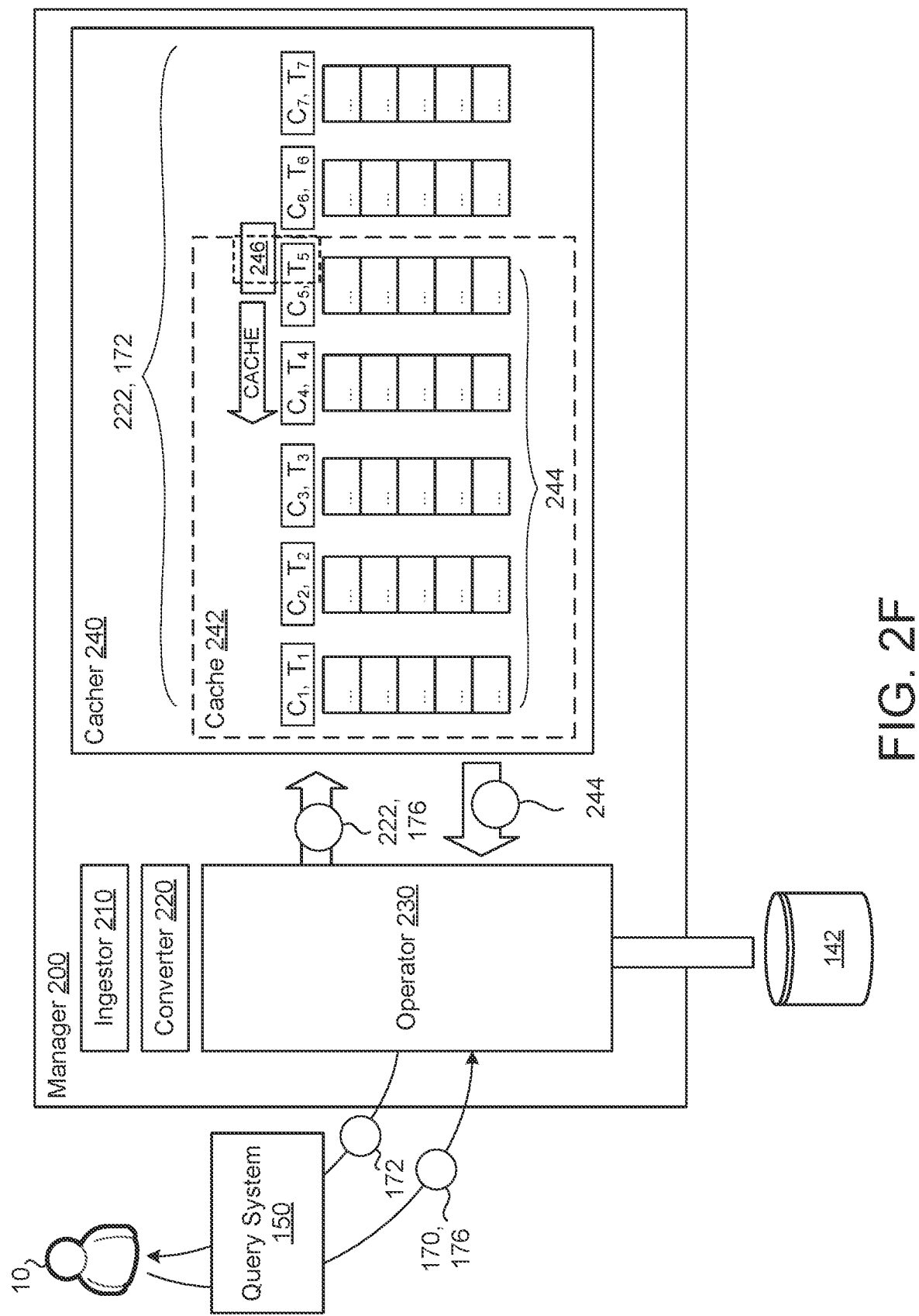
FIG. 2F is a schematic view of an example cacher for the data manager of FIG. 2A.

Referring to FIG. 2F, the manager 200 may utilize a caching approach to query optimization. For instance, often storage systems 140 and systems preparing data for storage in a storage system 10 (e.g., the ingestor 210 and/or converter 220) partition data based on units of time. For instance, the columns C associated with the query files 222 include a column timestamp T that indicates the time units that partition the columns C. These time units may be minutes, hours, days, weeks, months, etc. For example, FIG. 2F illustrates a week of query files 222 with a time partition of days (e.g., column timestamps $T_{1-7}$). The cacher 240 is configured to determine whether data stored within the storage system 140 is static data. For instance, the cacher 222 determines whether user data 12 stored in query files 222 is static data. Static data refers to data that remains unchanged (i.e., unaffected) during storage operations to the storage system 140. Static data occurs because storage systems 140 with data warehouses 142 are configured to be central data depositories for significant amounts of user data 12. Although storing a considerable amount of user data 12 may benefit the user 10 to understand data trends or perform data analytics on the user data 12, it also means that a majority of data stored within a data warehouse 142 may be seldom altered (e.g., only subject to read operations). By identifying static user data or cold user data within a storage system 140, the cacher 240 may cache query responses 172 over time for the identified static user data to reduce query processing for future read operations on the static user data.

To illustrate, FIG. 2F depicts that the cacher 230 has determined that the first through fifth columns $C_{1-5}$ of user data 12 in the query files 222 correspond to static data. In other words, of the past seven days of user data 12 that the storage system 140 stores, the oldest five days have been remaining unchanged while the newest two days have been still experiencing some storage operations. In some examples, the cacher 230 determines whether user data 12 in a query file 222 is static data by using a last modification time associated with the query file 222. Here, the last modification data refers to a timestamp T associated with a column C of data (e.g., a query file 222) that indicates the last time when any data within the column C has been subject to a change or a modification. In some implementations, the cacher 240 determines that the last modification time associated with a query file 222 satisfies a static data threshold 246. The static data threshold 246 refers to a value (e.g., configured by the cacher 230) that indicates a likelihood that stored data within a query file 222 is to remain unchanged during future storage operations of the storage system 140. In FIG. 2F, the cacher 230 determines that the fifth column timestamp $T_5$ associated with the fifth column $C_5$ of user data 12 satisfies the static data threshold 246. In some examples, when the cacher 230 determines that a particular timestamp T satisfies a static data threshold 246, the cacher 230 is configured to presume that query files 222 partitioned in time before the particular timestamp T also satisfy the static data threshold 246 (i.e., likely contain static data). For instance, FIG. 2F illustrates that the cacher 242 determines that the first through fifth columns $C_{1-5}$ of data correspond to static data because the timestamp $T_5$ of the fifth column $C_5$ satisfies the static data threshold 246.

In some configurations, the cacher 240 automatically caches user data 12 that the cacher 240 determines to be static user data by converting the static user data to cached user data 244. Yet in other configurations, once the cacher 240 determines that columns C of user data 12 (e.g., query files 222) include static user data, the cacher 240 caches this static user data during the next time the static user data is provided as a query response 172. By waiting until the manager 200 provides the static user data as a query response 172, the cacher 240 may conserve processing resource by not caching large amounts of data that do not relate to desired data (i.e., data requested by a query 170).

Using the caching approach, when the operator 230 receives a query 170, the operator 230 is configured to retrieve user data 12 in the storage system 140 requested by the query 170. With a caching approach, the cacher 240 is configured to receive or to identify the stored user data 12 (e.g., shown as the query files 222) relating to the query 170 and to determine whether any portion of stored user data 12 corresponds to cached user data 244 at a cache 242 associated with the cacher 240. In some examples, the query 170 requests stored user data for a particular time interval 176 (e.g., the past seven days of buyers). With the particular time interval 176, the cacher 240 determines whether any portion of the time interval 176 corresponds to cached user data 244. Here, of the past seven days, the cacher 240 has previously cached five of those seven days (e.g., as shown by timestamps $T_{1-5}$ in the cache 242). Because the cacher 240 determines that some portion of the requested data had already been cached, the cacher 240 supplies the cached user data 222 to partially (or completely) fulfill the query 170 without the need to execute read operations on the storage system 140 for the portion of the time interval 176 associated with the cached user data 244. For any remaining portion of the time interval 176 not fulfilled by cached user data 244, the operator 230 facilitates read operations to retrieve the respective stored user data 12.

In some implementations, a portion of the time interval 176 corresponds to static user data stored in the storage system 140, but the cacher 240 has not yet converted the static user data into cached user data 244. Here, the cacher 240 is not yet able to provide cached user data 244 to fulfill a portion of the query 170. Yet when the operator 230 provides the static user data in its query response 172, the cacher 240 identifies that this static user data may potentially be the subject of future queries 170 and caches the static user data. In other words, if during or prior to a query 170 for the past seven days of buyer history, the cacher 240 identified that the oldest five days of buyer history are static user data (e.g., columns $C_{1-5}$), but had not yet cached the identified static user data. The cacher 240 would cache the oldest five days of buyer history either when the manager 200 returned the query response 172 or shortly thereafter.

Figure 3:
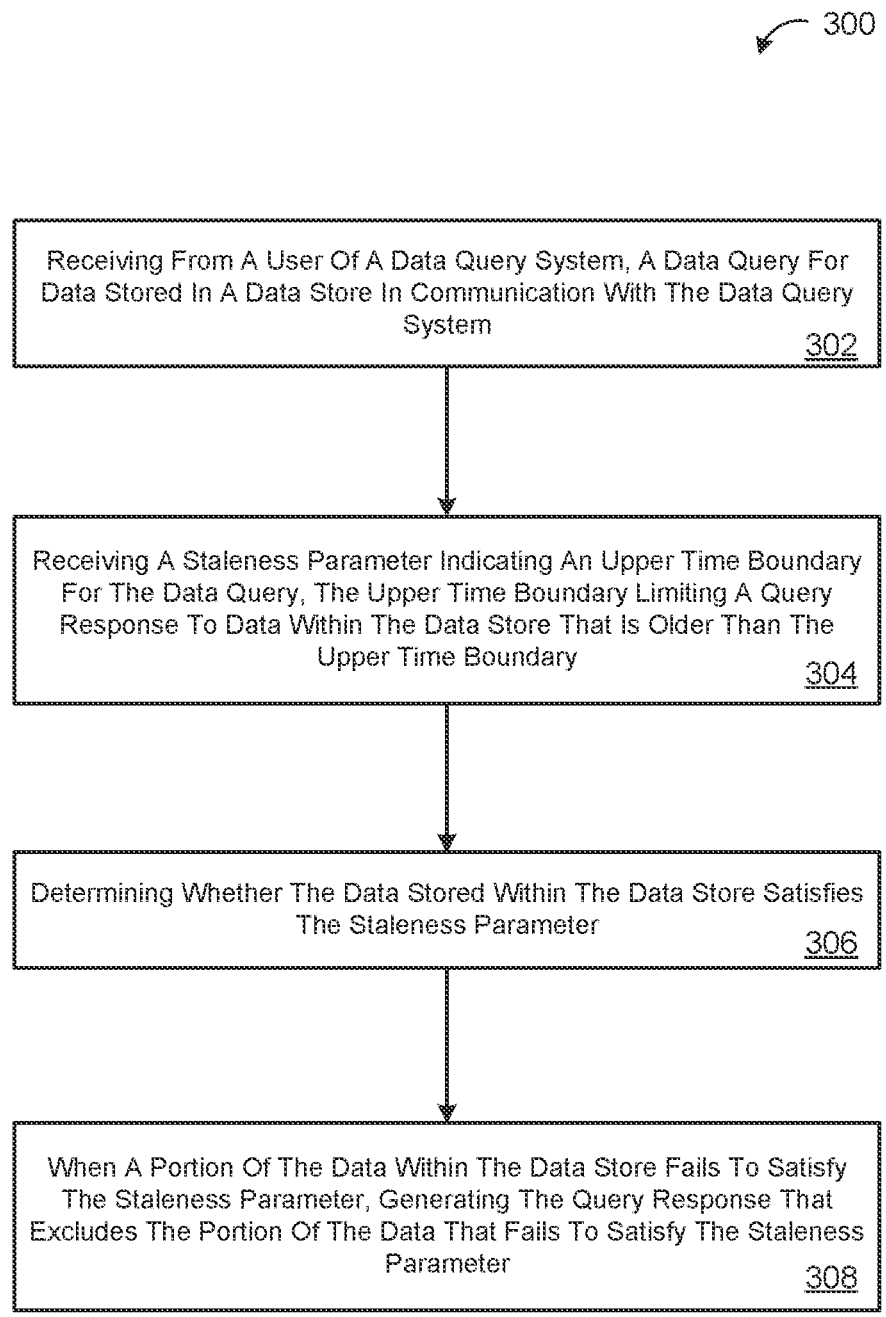
FIGS. 3 and 4 are flow charts of example arrangements of operations for methods of data processing.

FIG. 3 is a flowchart of an example arrangement of operations for a method 300 of data management. At operation 302, the method 300 receives, from a user 10 of a query system 150, a data query 170 for data 12 stored in a data store 142 in communication with the data query system 150. At operation 304, the method 300 receives a staleness parameter 174 indicating an upper time boundary for the data query 170. The upper time boundary limiting a query response 172 to data 12 within the data store 142 that is older than the upper time boundary. At operation 306, the method 300 determines whether the data stored within the data store 142 satisfies the staleness parameter 174. When a portion of the data 12 within the data store 142 fails to satisfy the staleness parameter 174, at operation 308, the method 300 generates the query response 172 that excludes the portion of the data 12 that fails to satisfy the staleness parameter 174. For example, the method 300 generates the query response 172 that excludes the portion of the data 12 that has been written to the data store more recently than the upper time boundary of the staleness parameter.

Figure 4:
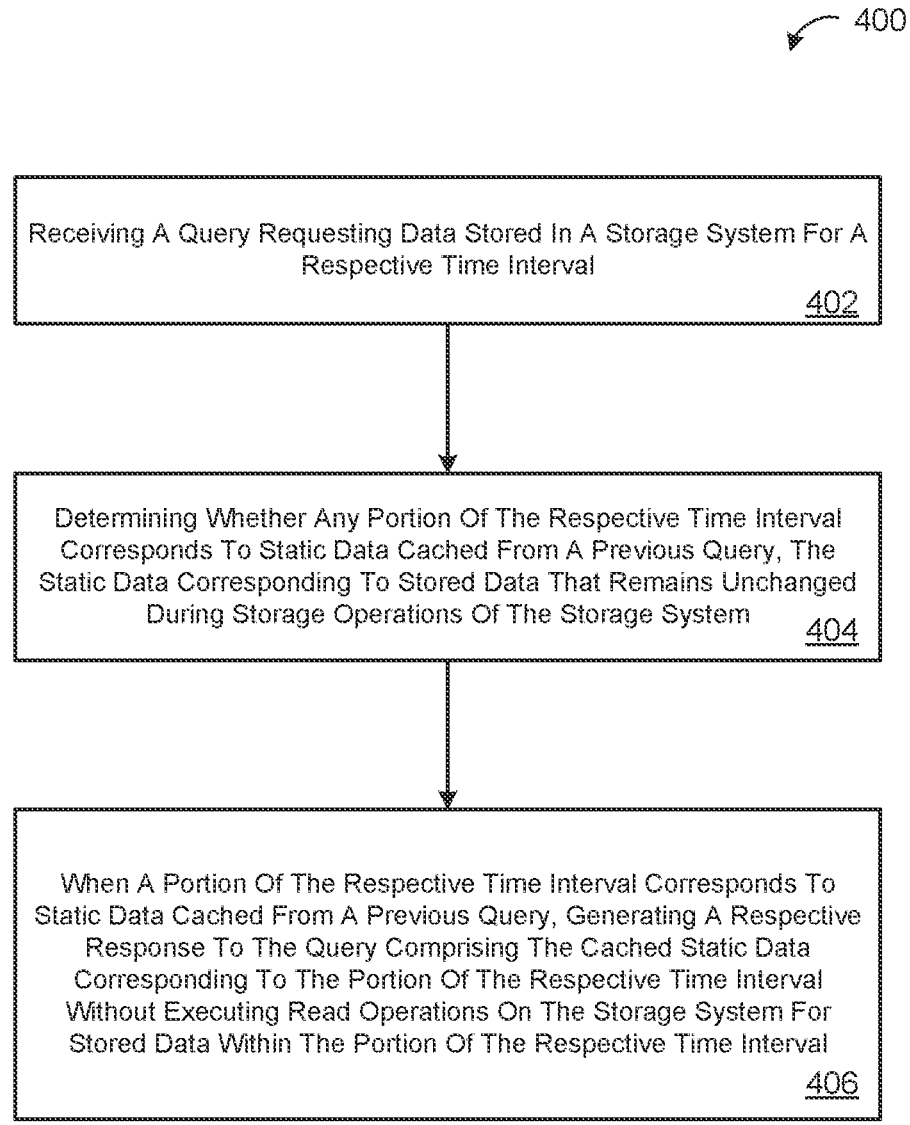

FIG. 4 is a flowchart of another example arrangement of operations for a method 400 of data management. At operation 402, the method 400 receives a query 170 requesting data 12 stored in a storage system 140 for a respective time interval 176. At operations 404, the method 400 determines whether any portion of the respective time interval 176 corresponds to static data cached from a previous query 170. The static data corresponds to stored data 12 that remains unchanged during storage operations of the storage system 140. When a portion of the respective time interval 176 corresponds to static data cached from a previous query 170, at operation 406, the method 400 generates a respective response 172 to the query 170. The response 172 includes the cached static data 244 corresponding to the portion of the respective time interval 176 without executing read operations on the storage system 140 for stored data within the portion of the respective time interval 176.

Figure 5:
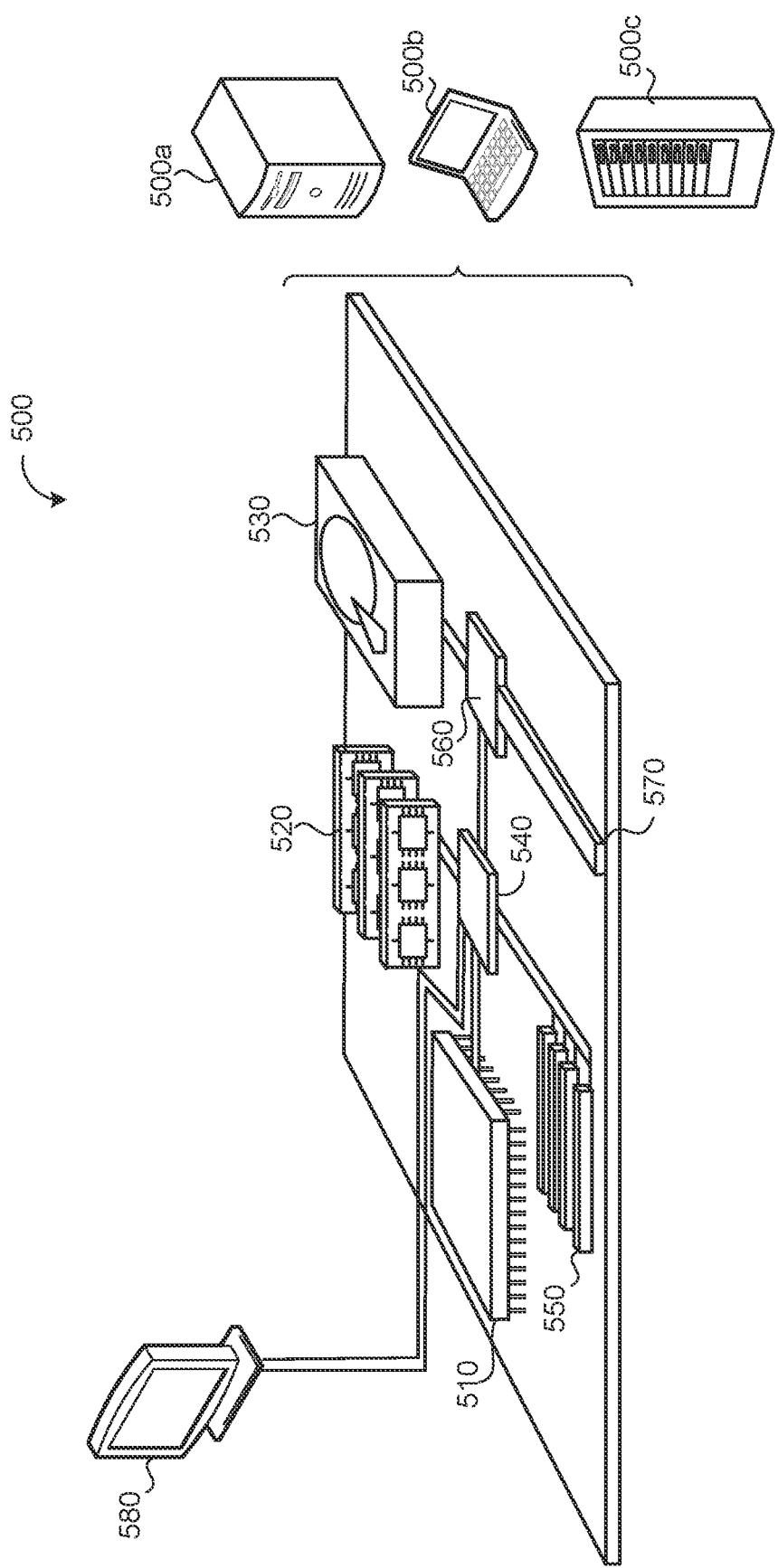
FIG. 5 is a schematic view of an example computing device that may be used to implement the systems and methods described herein.

FIG. 5 is schematic view of an example computing device 500 that may be used to implement the systems (e.g., the manager 200, the remote system 130, the storage system 140, the query system 150, the analytics system 160) and methods (e.g., the method 300, 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
receiving a query requesting data stored in a storage system for a respective time interval;
determining that a portion of the respective time interval corresponds to static data cached in a cache from a previous query, the static data corresponding to stored data that remains unchanged during storage operations of the storage system, the cache separate from the storage system, and wherein querying the cache uses less query time than querying the storage system; and
based on determining that the portion of the respective time interval corresponds to the static data cached from a previous query, generating a respective response to the query comprising the cached static data corresponding to the portion of the respective time interval without executing read operations on the storage system for stored data within the portion of the respective time interval;
determining that a second portion of the respective time interval fails to correspond to any static data cached in the cache;
based on determining that the second portion of the respective time interval fails to correspond to any static data cached in the cache, determining that a portion of the data stored in the storage system for the respective time interval comprises second static data;
generating a second response to the respective query comprising the requested data and including the portion of data corresponding to the second static data for the respective time interval; and
caching the portion of the data corresponding to second static data for the respective time interval.

2. The method of claim 1, wherein the operations further comprise:
receiving an initial query requesting data stored in the storage system for an initial time interval;
determining that a portion of the data stored in the storage system for the initial time interval comprises static data;
generating a response to the initial query comprising the requested data and including the portion of data corresponding to the respective static data for the initial time interval; and
caching the portion of the data corresponding to static data for the initial time interval.

3. The method of claim 2, wherein determining that the portion of the data stored in the storage system for the initial time interval comprises static data comprises identifying timestamps associated with a columnar format for the data stored in the storage system, the timestamps indicating a last modification date for the stored data in a given column.

4. The method of claim 2, wherein determining that the portion of the data stored in the storage system for the initial time interval comprises static data comprises determining that a timestamp associated with a given column of stored data in the storage system satisfies a static data threshold, the timestamp indicating a last modification date for the stored data in the given column, the static data threshold indicating a likelihood that the stored data in the given column remains unchanged during future storage operations of the storage system.

5. The method of claim 1, wherein generating the respective response to the query comprises executing read operations on the storage system for stored data within the respective time interval, but not within the portion of the respective time interval corresponding to the static data cached from the previous query.

6. The method of claim 1, wherein the storage operations comprise storing a continuous data stream of real-time data from a user of the storage system.

7. The method of claim 1, wherein the operations further comprise communicating the respective response to the query to a data analytics system, the data analytics system configured to generate a graphical representation for the respective response.

8. A system comprising:
data processing hardware; and
memory hardware in communication with the data processing hardware, the memory hardware storing instructions that when executed on the data processing hardware cause the data processing hardware to perform operations comprising:
receiving a query requesting data stored in a storage system for a respective time interval;
determining that a portion of the respective time interval corresponds to static data cached in a cache from a previous query, the static data corresponding to stored data that remains unchanged during storage operations of the storage system, the cache separate from the storage system, and wherein querying the cache uses less query time than querying the storage system; and
based on determining that the portion of the respective time interval corresponds to the static data cached from a previous query, generating a respective response to the query comprising the cached static data corresponding to the portion of the respective time interval without executing read operations on the storage system for stored data within the portion of the respective time interval;
determining that a second portion of the respective time interval fails to correspond to any static data cached in the cache;
based on determining that the second portion of the respective time interval fails to correspond to any static data cached in the cache, determining that a portion of the data stored in the storage system for the respective time interval comprises second static data;
generating a second response to the respective query comprising the requested data and including the portion of data corresponding to the second static data for the respective time interval; and
caching the portion of the data corresponding to second static data for the respective time interval.

9. The system of claim 8, wherein the operations further comprise:
receiving an initial query requesting data stored in the storage system for an initial time interval;
determining that a portion of the data stored in the storage system for the initial time interval comprises static data;

generating a response to the initial query comprising the requested data and including the portion of data corresponding to the respective static data for the initial time interval; and caching the portion of the data corresponding to static data for the initial time interval.

10. The system of claim 9, wherein determining that the portion of the data stored in the storage system for the initial time interval comprises static data comprises identifying timestamps associated with a columnar format for the data stored in the storage system, the timestamps indicating a last modification date for the stored data in a given column.

11. The system of claim 9, wherein determining that the portion of the data stored in the storage system for the initial time interval comprises static data comprises determining that a timestamp associated with a given column of stored data in the storage system satisfies a static data threshold, the timestamp indicating a last modification date for the stored data in the given column, the static data threshold indicating a likelihood that the stored data in the given column remains unchanged during future storage operations of the storage system.

12. The system of claim 8, wherein generating the respective response to the query comprises executing read operations on the storage system for stored data within the respective time interval, but not within the portion of the respective time interval corresponding to the static data cached from the previous query.

13. The system of claim 8, wherein the storage operations comprise storing a continuous data stream of real-time data from a user of the storage system.

14. The system of claim 8, further comprising communicating the respective response to the query to a data analytics system, the data analytics system configured to generate a graphical representation for the respective response.

* * * * *